(12) United States Patent
Tornero

(10) Patent No.: US 6,365,087 B2
(45) Date of Patent: *Apr. 2, 2002

(54) METHOD FOR FORMING A CUSHION

(75) Inventor: Roger Tornero, Greensboro, NC (US)

(73) Assignee: Matrex Furniture Components, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,089

(22) Filed: Oct. 15, 1999

Related U.S. Application Data

(63) Continuation of application No. 08/995,526, filed on Dec. 22, 1997, now Pat. No. 6,068,808, which is a continuation of application No. 08/901,861, filed on Jul. 29, 1997, which is a division of application No. 08/709,465, filed on Sep. 3, 1996, now Pat. No. 5,686,035, which is a division of application No. 08/545,055, filed on Oct. 19, 1995, now Pat. No. 5,562,873, which is a continuation of application No. 08/290,368, filed on Aug. 15, 1994, now abandoned.

(51) Int. Cl.⁷ .......................... B29C 43/04; B29C 43/20
(52) U.S. Cl. ........................ 264/316; 156/212; 156/216; 264/313; 264/321
(58) Field of Search ............................... 156/212, 216; 264/313, 316, 321

(56) References Cited

U.S. PATENT DOCUMENTS

| | | | | |
|---|---|---|---|---|
| 3,146,143 A | * | 8/1964 | Bolesky et al. | 156/216 |
| 3,325,329 A | * | 6/1967 | Bolesky et al. | 156/216 |
| 4,102,975 A | * | 7/1978 | Doerer | 264/322 |
| 5,238,514 A | * | 8/1993 | Tornero | 156/196 |
| 5,407,510 A | * | 4/1995 | Marfilius et al. | 156/212 |
| 5,425,836 A | * | 6/1995 | Shimada et al. | 156/475 |
| 5,562,873 A | * | 10/1996 | Tornero | 264/161 |
| 5,686,035 A | * | 11/1997 | Tornero | 264/161 |
| 6,068,808 A | * | 5/2000 | Tornero | 264/316 |

* cited by examiner

Primary Examiner—Allan R. Kuhns

(57) ABSTRACT

A seat cushion mold with an elastic member and method provide the manufacture of an improved seat cushion for use in upholstered chairs or the like having a smooth, uniform shape without unsightly underlines. A thick, resilient foam block is positioned on a rigid planer base and is urged into the mold whereby a thin foam cover layer is adhered to the outer edges of the planar base to produce a precisely contoured cushion which can be upholstered and fitted to a chair frame.

7 Claims, 5 Drawing Sheets

METHOD FOR FORMING A CUSHION

This is a continuation of prior application Ser. No. 08/995,526 filed Dec. 22, 1997, now U.S. Pat. No. 6,068,808, which was a continuation of Ser. No. 08/901,861 filed Jul. 29, 1997, pending; which was a divisional of Ser. No. 08/709,465 filed Sep. 3, 1996, now U.S. Pat. No. 5,686,035; which was a divisional of Ser. No. 08/545,055 filed Oct. 19, 1995, now U.S. Pat. No. 5,562,873; which was a continuation of Ser. No. 08/290,368 filed Aug. 15, 1994 now abandoned.

BACKGROUND OF THE INVENTION

1. Field of the Invention

The present invention pertains to a mold for the formation of seat cushions and particularly for forming a cushion for an upholstered chair seat or the like using a mold having an elastic sheet.

2. Description of the Prior Art and Objectives of the Invention

Polyurethane foam and other resilient materials have been used for seat cushions for many years in the upholstered furniture industry. Foam blocks of various dimensions and densities are cut then covered with fabric to form seat cushions for sofas, chairs and other furniture. Additionally, chair and sofa frames are likewise often partially wrapped with resilient foam prior to covering with a selected fabric to achieve the desired contours and appearance. In the cost conscious furniture industry, it has lately been the practice to preassemble foam covered components at various shops which are then assembled at a central plant to expedite the manufacturing process. For example, upholstered chair manufacturers may contract through "outside" sources to purchase a partial chair seat assembly consisting of a wooden base having a contoured foam block glued thereto. The furniture maker, after receiving this partial seat assembly, covers it with a fabric and subsequently attaches it to a finished chair frame. A large number of such partial seat assemblies may be kept on hand by the furniture manufacturer so changes to the fabric type or style can be quickly made depending on the customer's needs. While such partial seat assemblies can be made to exact standards, concerns and uniformity problems arise as the partial seat assembly is subject to an individual upholsterer's ability to correctly tension and attach the fabric cover and any additional layers prior to fixing the fabric cover thereto. The final steps in the chair production are subject to the particular craftsman's skills and oftentimes, by applying too little or too much manual pressure during attachment of the fabric covering, an unacceptable product results. This oftentimes occurs along the upper contours and crown at the top of the seat.

With the known disadvantages and problems associated with the prior art seat cushion assemblies, the present invention was conceived and one of its objectives is to provide a distortable seat cushion mold that will allow a manufacturer to produce an attractive, uniform and consistent seat on each chair manufactured.

It is another objective of the present invention to provide a seat cushion that will allow the upholsterer ease and convenience in covering the cushion.

It is still another objective of the present invention to provide a seat cushion that has no unsightly underlines and one that is contoured evenly throughout.

It is yet another objective of the present invention to provide a method for forming a seat cushion in which a plurality of synthetic foam components are attached to a rigid base to form a smooth, even crown.

It is still another objective of the present invention to provide a method for forming a seat cushion whereby a distortable seat cushion mold is used to insure uniformity in the crown.

It is also another objective of the present invention to provide a seat cushion from the process as described above.

Various other objectives and advantages of the present invention become apparent to those skilled in the art as a more detailed presentation of the invention is set forth below.

SUMMARY OF THE INVENTION

The invention herein pertains to a seat cushion mold, a method for using the mold to form a cushion for a chair seat or the like and the product formed therefrom. The mold includes an elastic sheet which is distortable downwardly into a concave shape. The method of forming the cushion comprises contacting at least one foam block by a rigid planar base. Next, a thin foam layer is positioned over the foam block. The planar base, the contacted foam block and the thin foam layer are then positioned, foam layer side down, atop a mold with an elastic sheet and are pressed downwardly into the elastic sheet by, for example, a hydraulic press, which compresses the foam block into a convex mound within the now stretched, concave elastic sheet. The thin foam layer is then urged against the edges of the planar base while the thin foam layer is being adhesively attached to the base. Afterwards, the extending ends of the thin foam layer are trimmed and a seat cushion is thereby provided which can be upholstered with a desired fabric for later installation into a chair frame.

DESCRIPTION OF THE PREFERRED EMBODIMENT

The preferred process of the invention is illustrated in FIGS. 1–6 whereby a planar base formed from one inch thick wood having a solvent based contact cement on the outer edges is placed next to a first relatively large, somewhat rectangular, ¾" thick polyurethane foam block with a density of 1.5 pounds per cubic foot (P.C.F.) and an indentation load deflection (I.L.D.) of 35 pounds. Planar bases can be first stacked and the edges simultaneously sprayed with a fast drying contact cement. Positioned next to this large foam block is a smaller, somewhat rectangular, 1" thick polyurethane foam block with a density of 1.8 P.C.F. and an I.L.D. of 40 pounds. Placed next to the smaller foam block is a second large block identical to the first. Contacting the second large block is a relatively thin, somewhat rectangular, ⅜" thick polyurethane foam cover layer with a density of 2.0 P.C.F. and an I.L.D. of 25 pounds. A contact cement is spread around the top surface along the edges of the cover layer and is allowed to dry. The seat components are then placed on a mold consisting of a ⅛" thick planar rubber bladder fitted over a wooden frame approxiately 4" high and 24" long on each side. Pressure from a vertical ram, such as a pneumatic cylinder press, forces the seat components into the mold whereby the rubber bladder or sheet deflects downwardly approximately 2½" into a concave shape. The foam components are thus molded into a convex, inverted crown shape corresponding to the concave shape of the deflected rubber bladder. The free ends of the thin foam cover layer are urged against the edges of the planar base and the contact adhesive secures the thin foam cover layer to the planar base edges. Excess free ends of the foam cover layer are then trimmed and the seat cushion which results therefrom is smooth, uniform and ready for fabric covering and attachment to a chair frame.

DETAILED DESCRIPTION OF THE DRAWINGS AND OPERATION OF THE INVENTION

Figure 1:
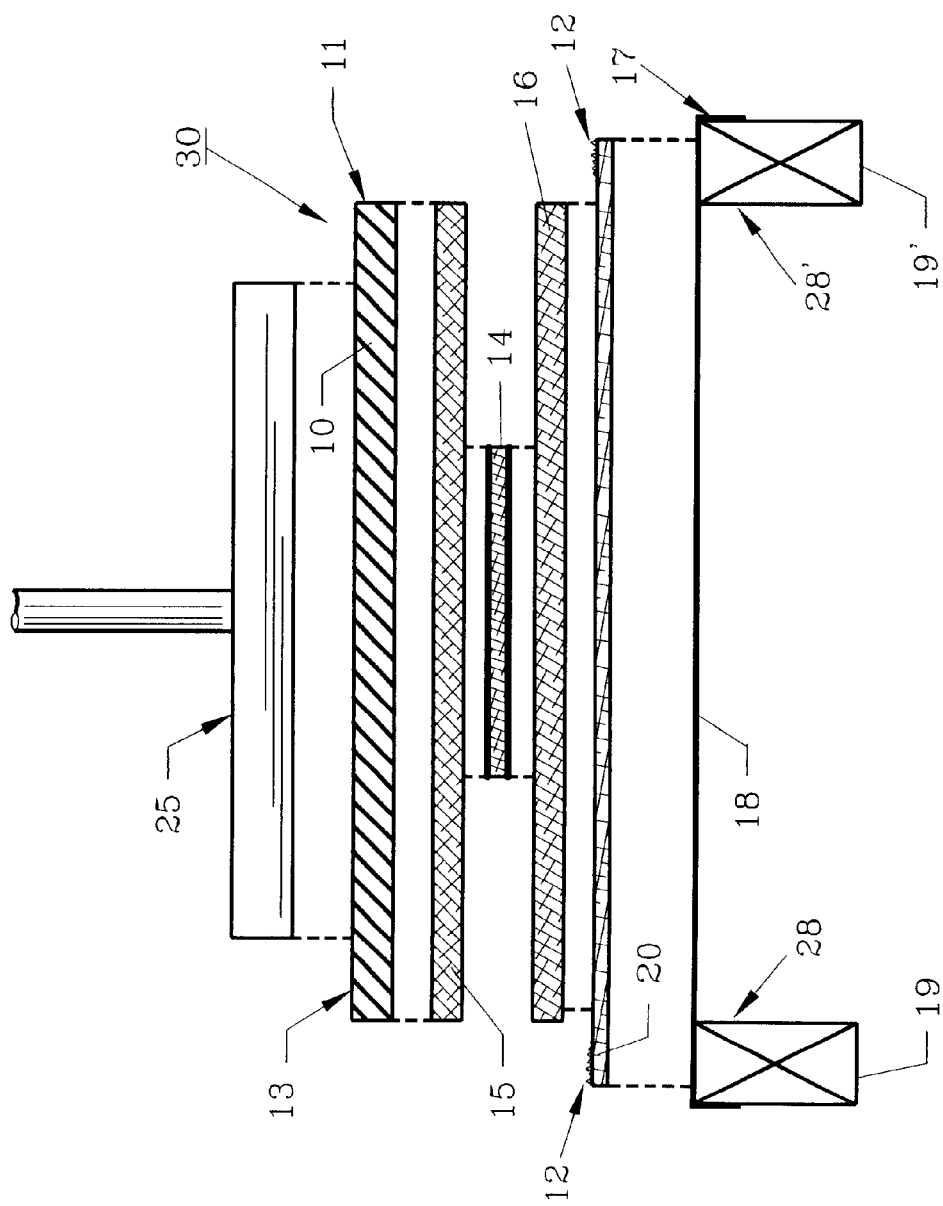
FIG. 1 shows an exploded cross-sectional view of the invention including seat cushion components consisting of a planar base, foam blocks and a thin foam cover layer above the seat cushion mold.
Figure 5:
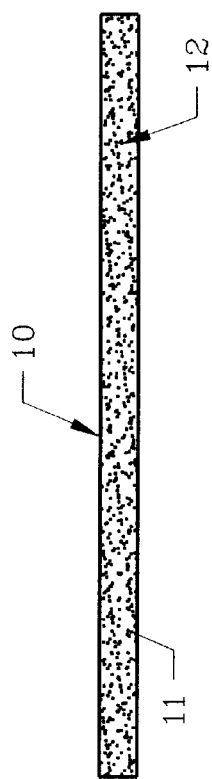
FIG. 5 shows an edge of the planar base as covered with adhesive.

For a more complete understanding of the invention and the process involved, turning now to the drawings, FIG. 1 illustrates an exploded view of a conventional chair seat cushion 30, as is used in chairs, and seat cushion mold 17 in combination with pressure ram 25 used to form cushion 30. Seat cushion 30 components are shown inverted, as they are used during construction, but of course when assembled and mounted to a completed chair frame or the like, they would be turned over. Seat cushion 30 components include planar base 10 comprising a relatively rigid, one inch thick member having a desired outer configuration which may be square with rounded corners, rectangular or having other shapes as desired and made of plywood, composite board, or other suitable material. Below base 10 in FIG. 1 are first large, relatively low density polyurethane foam block 15, small, higher density polyurethane foam block 14, second large, relatively low density polyurethane foam block 16, and thin polyurethane foam cover layer 20. Cover layer 20 is spread with an adhesive along its top surface, near its edges, such as with a solvent based contact cement 12 (shown in exaggerated amounts for clarity in FIG. 1). Cement 12 is also spread on the outer edges 11 of planar base 10, as shown in FIG. 5.

As is well known by those skilled in the chair manufacturing art, it is usual to affix foam blocks to a planar seat base and therefore these aspects of the invention, as illustrated in FIG. 1, are conventional. Likewise, it is conventional in the furniture trade to "mix" the density of foam blocks in forming cushions; however, the following structure and steps as shown in FIGS. 1–4 and 6 are new and nonconventional and provide an improved seat cushion. Seat cushion 30 components 10, 14, 15, 16 and 20 are positioned above cushion mold 17, which has a generally square frame and top elastic member 18. Two frame side members 19, 19' are illustrated in FIGS. 1–4 and frame front member 26 is illutrated in FIG. 6, but as would be understood, another frame member 26' (not shown) is used to form a back frame member. Planar elastic member 18 may be composed of sheet rubber, fabric or other suitable synthetic or natural elastic materials and is fitted over the top of cushion mold 17 and affixed at the periphery along the outer sides of frame members 19, 19', 26, and 26'. While mold 17 is seen in rectangular form, other shapes could likewise be utilized.

Figure 2:
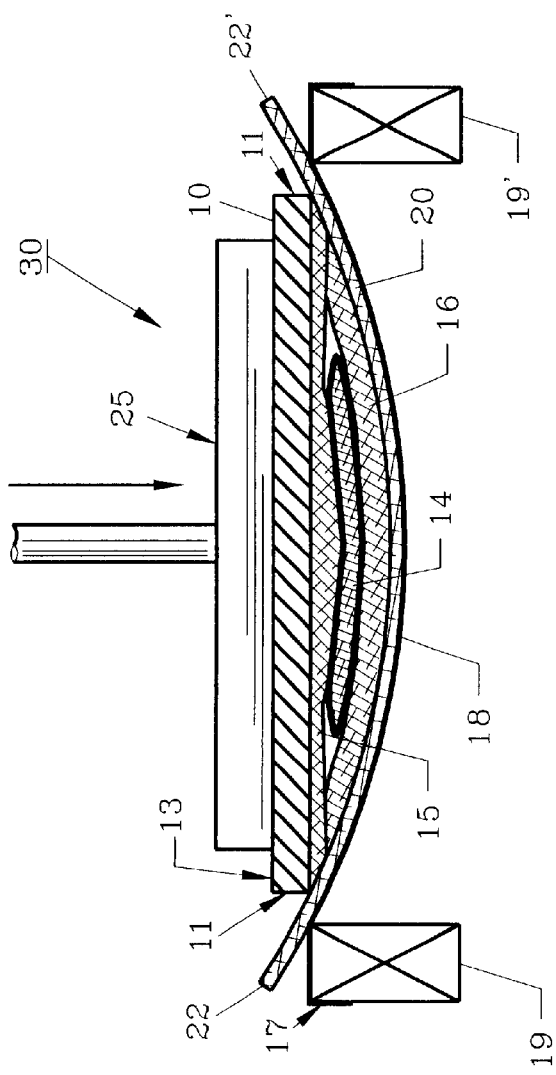
FIG. 2 demonstrates seat cushion components of FIG. 1 compressed into the seat cushion mold with the top elastic sheet of the mold distorted downwardly into a concave shape while the foam blocks form an inverted convex cushion crown.

In FIG. 2, vertical pressure ram 25 is shown compressing and/or deflecting seat cushion components 10, 15, 14, 16 and 20 downwardly into mold 17 by driving against bottom surface 13 of planar base 10. Pressure ram 25 may be operated by hydraulic, pneumatic, electric or manual means as is conventional. Elastic member 18 is stretched and deflected downwardly approximately 2½" into a concave shape (FIG. 2) that molds and shapes foam components 15, 14, 16 and 20 into a convex, inverted crown 29 (FIG. 6), which corresponds to the contour of deflected elastic member 18. As seen in FIG. 2 perimeter portions of planar base 10 are exposed during compression by pressure ram 25.

Figure 3:
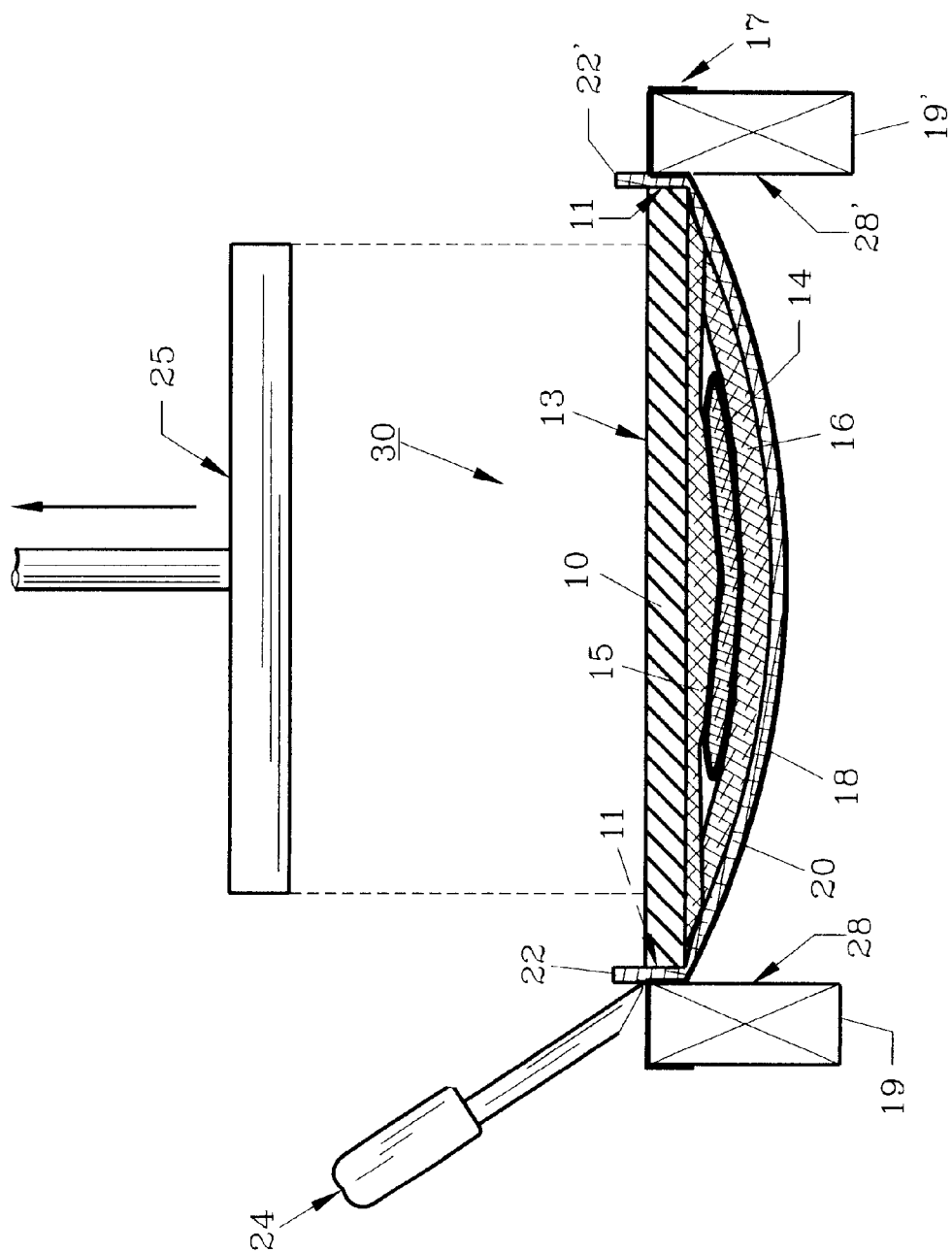
FIG. 3 illustrates the ends of the thin foam cover layer urged against the edges of the planar base for adhesive attachment thereto.
Figure 4:
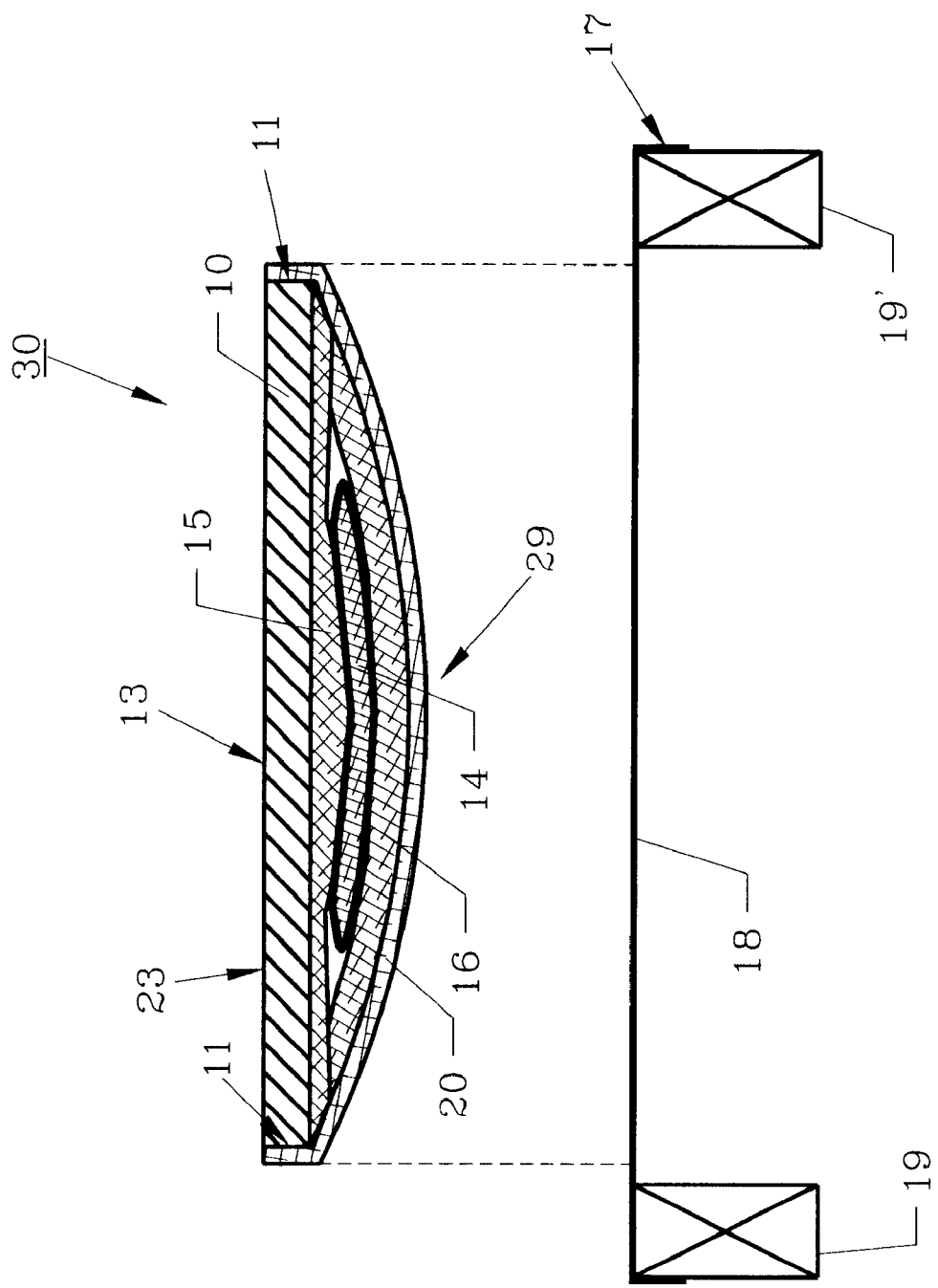
FIG. 4 depicts a cross-sectional view of an inverted seat cushion of the invention after removal from the mold.

Thus, as illustrated in FIGS. 2–4 the vertical pressure of ram 25 is effective to press the bottom surface 13 of the planar base 10 downwardly to a desired depth within distortable mold 17 so as to force cover layer 20, resilient blocks 14, 15 and 16 and planar base 10 therein while maintaining perimeter of bottom surface 13 of planar base 10 contiguous the side edges 11 of said planar base 10 exposed and free of contact with the distortable mold 17.

Figure 6:
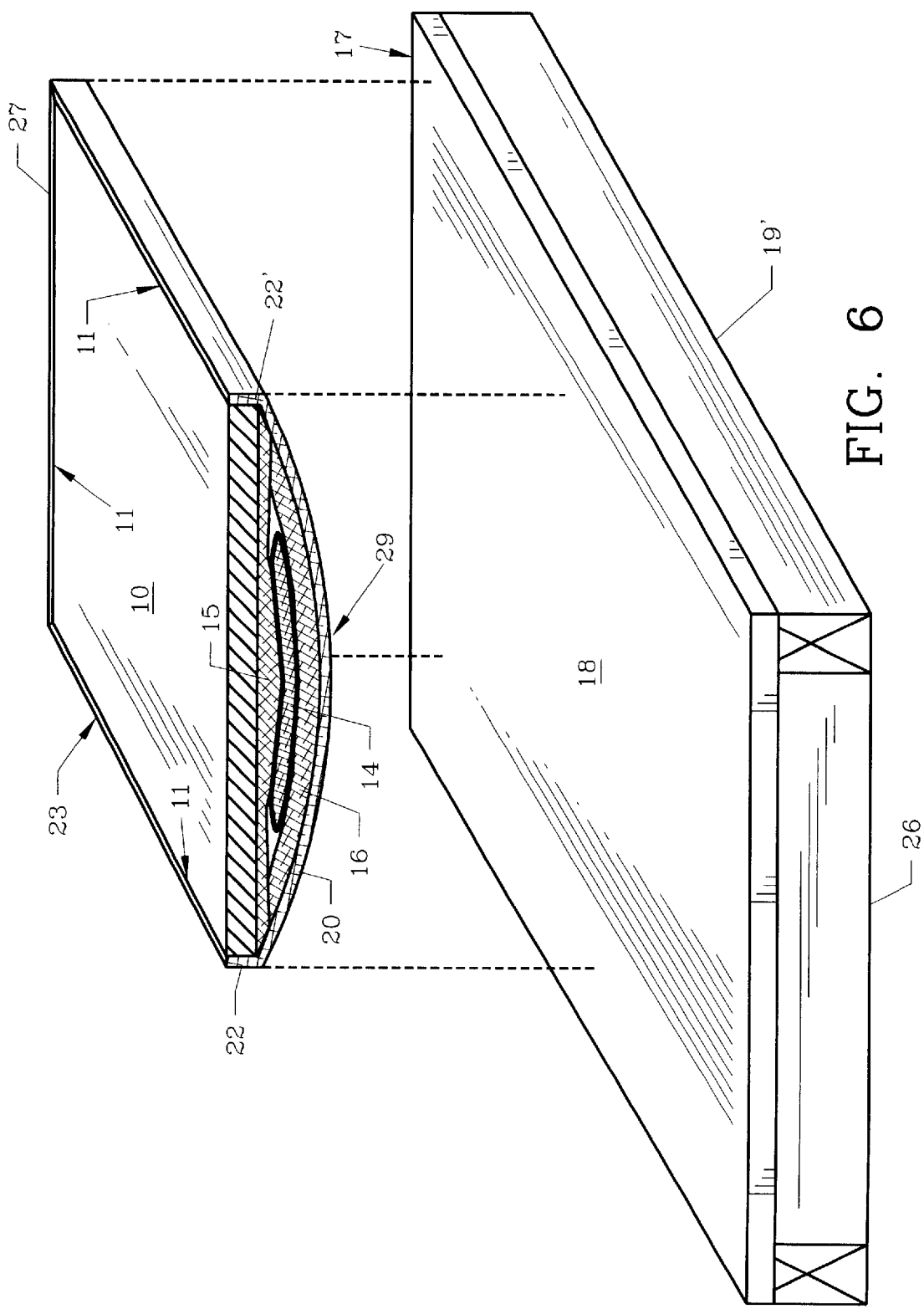
FIG. 6 illustrates a perspective view of the mold with an inverted seat cushion seen in cross section.

FIG. 3 illustrates free ends 22, 22' of foam cover layer 20 urged against edges 11 of planar base 10 and joined thereto by previously applied contact cement 12. As would be understood, ram 25 causes elastic members 18 to deflect downwardly and outwardly, whereas planar vertical inside walls 28, 28' of frame member 19, 19' limit the outward or horizontal deflection. Contact cement 12 may be solvent or water based and other suitable adhesives may also be used. As would be understood, all four ends of cover layer 20 are forced against the outer vertical edges 11 of planar base 10 and the figures herein, except for FIG. 6, show only two edges in cross-sectional view for clarity. FIG. 6 also shows back free end 27 attached to edge 11 of planar base 10. (Front free end 27' is not shown.) As seen in FIG. 3, free ends 22, 22' of foam cover layer 20 are lastly trimmed by knife 24 or the like to thereby complete the formation of seat cushion 23, as seen in FIGS. 3, 4 and 6 with base 10 covered completely with the exception of its exposed bottom surface 13. FIGS. 4 and 6 also illustrate elastic sheet 18 of mold 17 having rebounded into its original planar shape upon removal of completed seat cushion 23. Seat cushion 23, as completed, is now available for covering with a fabric or for other treatment prior to incorporation into a chair frame.

The mold and method as shown herein provide high production capacity while allowing the densities of the seat cushions to be easily varied. The outer shape of finished seat cushion 23 is consistent from cushion to cushion due to the design of mold 17. The method as described herein reduces operator fatigue and the possibility of carpal tunnel syndrome of the workers.

As would be understood, other shapes and types of cushions can likewise be formed from processes shown herein using different materials and the illustrations and examples are used for explanatory purposes and are not intended to limit the scope of the appended claims.

I claim:

1. A method of forming a cushion having a smooth bottom surface using an elastic member capable of being deflected to various depths as needed to properly form the cushion, said method consisting essentially of the steps of:

a) placing at least one resilient block on the top surface of a flat rigid planar base having side edges;

b) positioning a cover layer atop said resilient block, said cover layer having a width greater than the width of said planar base;

c) placing said cover layer, said resilient block, and said planar base onto said elastic member so that the bottom surface of said planar base is exposed;

d) pressing said bottom surface of said planar base:
  i) to force said cover layer, said resilient block and said planar base into said elastic member to a desired depth while maintaining perimeter portions of the bottom surface of said planar base exposed,
  ii) to deflect said elastic member to form said cover layer around said resilient block while forcing said cover layer against the side edges of said planar base while within the elastic member; and e) attaching said cover layer to the side edge of said planar base with excess cover layer extending beyond the bottom surface of said planar base to thereby form a cushion with the entirety of the bottom surface exposed.

2. The method of claim 1 wherein attaching said cover layer comprises the step of attaching said cover layer with an adhesive to said planar base.

3. The method of claim 1 wherein pressing upon the bottom surface of said planar base comprises the step of applying downward force upon said bottom surface with a ram.

4. The method of claim 1 and including the step of applying an adhesive to the side edges of said planar base.

5. The method of claim 1 wherein deflecting said elastic member comprises the step of deflecting said elastic member downwardly so as to invertedly form said cushion.

6. A method of forming a cushion having a smooth bottom surface using a distortable mold capable of being deflected to various depths as needed to properly form the cushion, said method consisting essentially of the steps of:

a) placing at least one resilient block on the top surface of a flat rigid planar base having side edges;

b) positioning a cover layer atop said resilient block, said cover layer having a width greater than the width of said planar base;

c) placing said cover layer, said resilient block, and said planar base onto said distortable mold so that the bottom surface of said planar base is exposed;

d) pressing said bottom surface of said planar base:
  i) to force said cover layer, said resilient block and said planar base into said distortable mold to a desired depth while maintaining perimeter portions of the bottom surface of said planar base exposed, and
  ii) to distort said mold to form said cover layer around said resilient block while forcing said cover layer against the side edges of said planar base while within the distortable mold; and e) attaching said cover layer to the side edge of said planar base with excess cover layer extending beyond the bottom surface of said planar base to thereby form a cushion.

7. A method for forming a cushion having a smooth bottom surface using a distortable elastic mold capable of being deflected to various depths as needed to properly form the cushion, said cushion comprising a flat rigid planar base, at least one resilient block, and a resilient cover layer, said method consisting essentially of the steps of:

a) placing at least one resilient block on the top surface of said planar base;

b) positioning a cover layer atop said resilient block with a peripheral portion of said cover layer extending beyond the side edges of said planar base;

c) placing said cover layer, said resilient block, and said planar base onto said elastic mold so that the bottom surface of said planar base is exposed;

d) pressing said bottom surface of said planar base to force said cover layer, said resilient block and said planar base into said elastic mold while maintaining perimeter portions of the bottom surface of said planar base exposed contiguous said side edges;

e) deflecting said elastic mold to a depth to mold said resilient cover layer and said resilient block and force said cover layer against the side edges of said planar base as said cover layer is pressed into said elastic mold; and f) attaching said cover layer to the side edge of said planar base with excess cover layer extending beyond the bottom surface of said planar base to form a seat cushion.

* * * * *